Dec. 20, 1955     H. A. ALEXANDERSON ET AL     2,727,578
POWER CONTROL
Filed March 9, 1945                                    4 Sheets-Sheet 3

Fig. 3.

Inventors
Howard A. Alexanderson
Harold A. Wheeler
By Herbert L. Davis, Jr.
ATTORNEY

United States Patent Office 2,727,578
Patented Dec. 20, 1955

2,727,578

POWER CONTROL

Howard A. Alexanderson, Wood Ridge, and Harold A. Wheeler, Alwood, N. J., assignors to Bendix Aviation Corporation, Teterboro, N. J., a corporation of Delaware Application March 9, 1945, Serial No. 581,878

24 Claims. (Cl. 170—135.74)

The present invention relates to improved control devices and systems of the class disclosed by U. S. Patent No. 2,453,652 granted November 9, 1948, on an application Serial No. 783,237 filed October 31, 1947, by Howard A. Alexanderson as a continuation of application Serial No. 508,724 filed November 2, 1943, by Howard A. Alexanderson and now abandoned. More specifically, the present invention relates to a novel and improved control mechanism for an aircraft which provides means for effecting simultaneously, selection of engine R. P. M.; selection of the intake manifold pressure of an internal combustion aircraft engine, and manual selection of a minimum throttle angle, including novel means for modifying the relationship between engine R. P. M. and manifold pressure in the cruising power ranges for best fuel economy.

An object of the invention is to provide novel means responsive to the intake manifold pressure for adjusting a carburetor throttle so as to approximate predetermined pressure values together with a novel pair of adjustable members for selecting such pressure values and manually operable means for selectively actuating one or the other of said members into operating relation.

Another object of the invention is to provide a novel adjustment means for directly actuating an automatic carburetor throttle control in a first sense, and a second novel intake manifold pressure responsive means for directly actuating the throttle control in an opposite sense so as to maintain a predetermined selected pressure value, which value is variable in accordance with a first selected program, and adjustable means for varying such value in accordance with a second selected program.

Another object of the invention is to provide a novel selector linkage arrangement, whereby the datum of the boost control may be selected in accordance with a first or second predetermined program.

A further object of the invention is to provide a novel control mechanism for selecting in accordance with a first selected program the intake manifold pressure and R. P. M. of the aircraft engine, including novel adjustable means for varying the relationship between intake manifold pressure and R. P. M. of the aircraft engine in accordance with a second selected program.

These and other objects of the invention are pointed out in the following description in terms of the embodiment thereof which is shown in the accompanying drawings. It is to be understood, however, that the drawings are for the purpose of illustration only, and are not designed as a definition of the limits of the invention, reference being had to the appended claims for this purpose.

Figure 1:
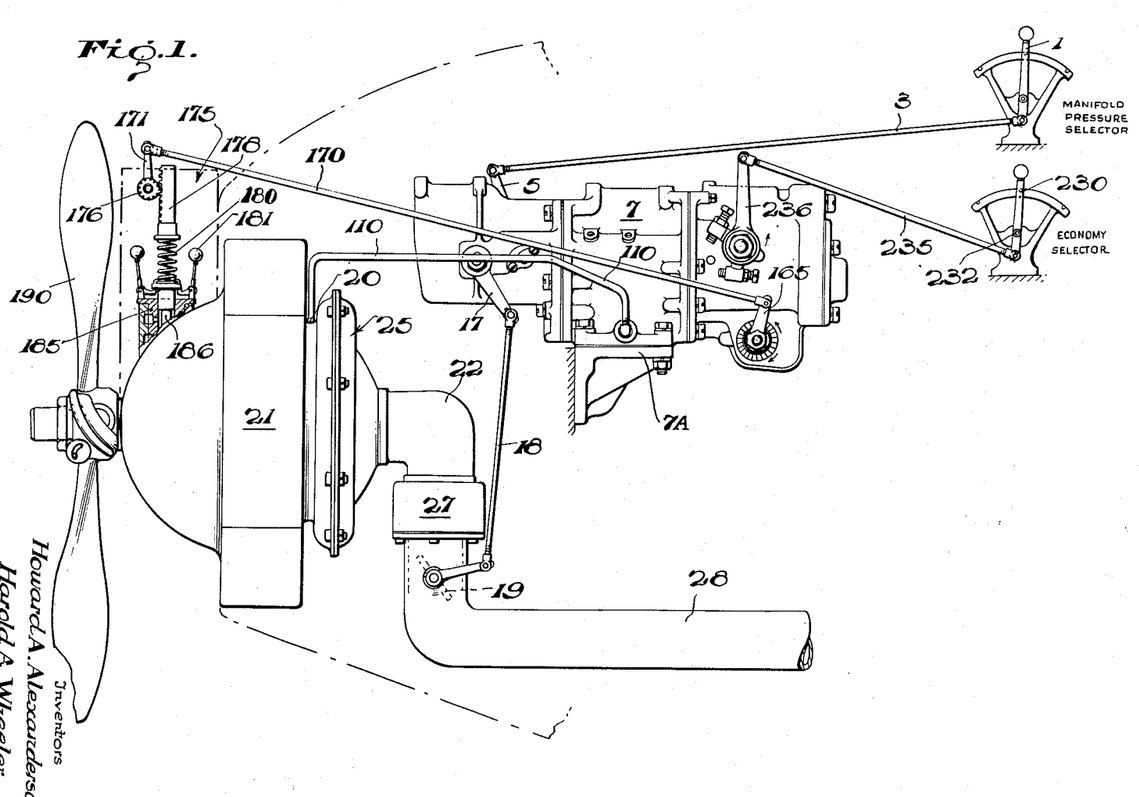
Figure 1 is a schematic view showing the control mechanism in operative relation with the aircraft mechanism controlled thereby.
Figure 3:
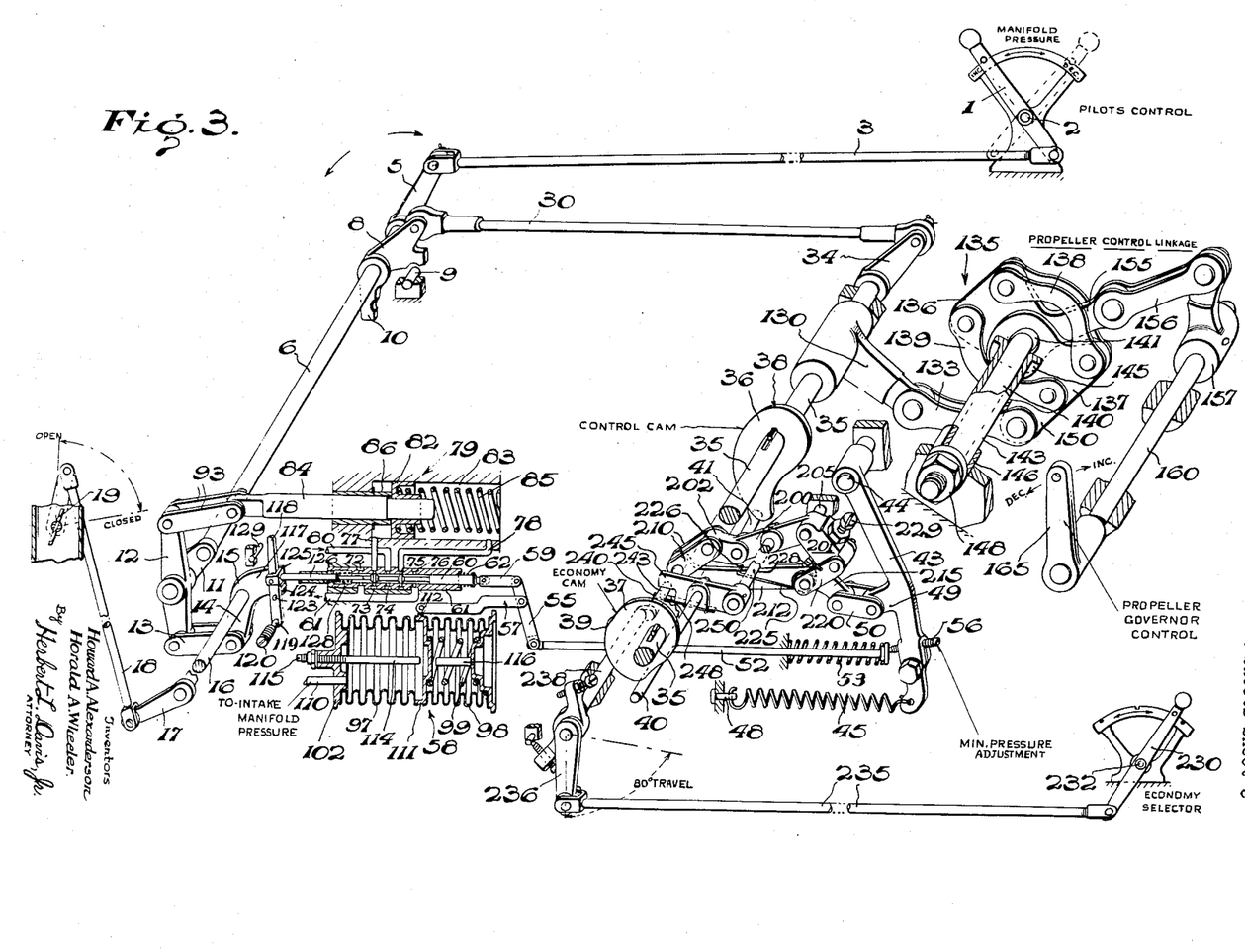
Figure 3 is a diagrammatic view of the operating mechanism.

The invention shown in Figures 1 and 3 is preferably operated by a main control lever 1 pivotally mounted at 2 within the cabin of an aircraft. There is pivotally connected to the control lever one end of a main control rod 3.

As shown in Figure 3, there is pivotally connected at the opposite end of the main control rod 3, an arm 5 mounted on a main control shaft 6 and positioned exteriorly of a casing 7. The casing 7 houses the novel control mechanism and may be conveniently mounted on a bracket 7A as shown in Figure 1.

As shown in Figure 3, there is formed integral with the arm 5, a second arm 8 likewise mounted on the main control shaft 6 and positioned exteriorly of the casing 7. Movement of the arm 8 may be limited as indicated in Figure 3 by a stop 9, which is arranged for engagement by the arm 8 and a second engaging arm 10 formed integral with the arm 8.

The main control shaft 6 extends into the casing 7 and is rotatably mounted on suitable anti-frictional roller bearings, not shown.

Positioned within the casing 7 and fixedly mounted at the inner end of the main control shaft 6 is a crank pin 11. The crank pin 11 has pivotally mounted at the free end thereof a walking beam 12. The walking beam 12 is pivotally connected at one end to a link 13 which is in turn pivotally connected at the other end to an arm 14 of a bell crank lever 15, as shown in Figure 3. The bell crank lever 15 is mounted on a shaft 16.

The shaft 16 is mounted on anti-frictional roller bearings, not shown, and projects through the casing 7, as shown in Figure 1. Mounted at the outer end of the shaft 16 is an arm 17 having pivotally connected at the free end a throttle control rod 18 for adjustably positioning a throttle valve 19 positioned within the air intake conduit of a conventional aircraft internal combustion engine, as indicated diagrammatically in Figure 1.

The throttle valve 19 is arranged so as to regulate the pressure at the intake manifold 20 of the engine 21 by regulating the air inlet through conduit 22 to a supercharger 25. The supercharger 25 is driven by the aircraft engine and arranged to supply air to the intake manifold 20. A carburetor 27 is provided on conduit 22 of conventional type and a conduit 28 leads from the carburetor 27 to a suitable air supply.

Pivotally connected to the arm 8, previously described, is one end of a linkage rod 30. The opposite end of the rod 30 is pivotally connected to one end of a lever arm 34 mounted on a pressure selector or cam shaft 35, as shown in Figure 3. The shaft 35 projects into the casing 7 and is preferably mounted therein on anti-frictional roller bearings, not shown.

The cam shaft 35 has fixedly mounted thereon, cams 36 and 37 which may be adjustably positioned by the adjustment of the shaft 35. The cams 36 and 37 have provided variable cam surfaces 38 and 39 respectively which are arranged to bear alternately upon pin members 40 and 41 as will be explained hereinafter, so as to operably connect the shaft 35 to an adjustable lever arm 43. As shown in Figure 3, the lever 43 is pivotally mounted within the casing 7 at one end thereof by a pin 44.

There is connected to the lever 43 at the opposite end, a spring 45 which is fastened within the casing 7 by a pin 48. The spring biases the lever 43 in a clockwise direction about the pin 44. Projecting from the lever 43 at a point intermediate the opposite ends thereof is a lug 49 to which there is pivotally connected a link 50 which operably connects through a novel linkage arrangement the lever 43 to the cams 36 or 37, as will be explained hereinafter.

The latter arrangement determines the adjustment of the lever 43 under the biasing force of the spring 45 for a purpose which will be explained hereinafter.

The lever 43 actuates a push rod 52 biased under tension of a spring 53 into contacting relation with one end of an adjustable screw 56, screw threadedly engaged in the lever 43.

The push rod 52 is pivotally connected at its opposite end to one end of a floating lever 55. The floating lever 55 is pivotally connected at a point intermediate its opposite ends to one end of a linkage arm 57. The linkage arm 57 is operatively connected at the opposite end to a pressure responsive mechanism indicated generally by the numeral 58 and which will be described hereinafter.

A third link 59 is pivotally connected at one end to the floating lever 55 at an end opposite from the push rod 52. The opposite end of the link 59 is affixed to a slidably adjustable member 60 for controlling a servo-valve of conventional type. The member 60 is slidably mounted within a valve sleeve 61, positioned within the wall of the casing 7. Carried by the servo-valve control 60 is a tension spring 62 which exerts a force biasing the link 59 toward the floating lever 55. The valve sleeve 61 has provided ports 72, 73, 74, 75 and 76, as shown in Figure 3. The ports 73 and 75 are connected by suitable conduits 77 and 78, respectively, to a servo-motor indicated generally by the numeral 79, while a conduit 80 is connected to the port 74 and serves as an inlet to the servo-valve of a suitable fluid medium under pressure such as oil under engine pressure for operation of the servo-motor 79. A drain conduit 81 is further connected to the ports 72 and 76 and serves as an outlet for the fluid pressure medium supplied to the servo-valve in the conventional manner.

As shown in Figure 3, a servo-piston 82 is slidably mounted within a cylinder wall 83 of the servo-motor 79. The piston 82 is connected to the piston rod 84 in any conventional manner. A tension spring 85 biases the piston 82 in a direction tending to slide the rod 84 outwardly from the cylinder 83 for a purpose which will be explained hereinafter. Movement of the piston 82 in response to the biasing force of the spring 85 is limited by a collar 86 against which the piston 82 abuts in the extreme biased position.

The conduits 77 and 78, previously described, lead to opposite sides of the piston 82 so that adjustment of the servo-valve control 60 to the left of the neutral position shown in Figure 3, will cause the conduit 77 to serve as an inlet of pressure to the servo-motor 49 and thereby exert a biasing force upon the piston 82 to the right. Likewise, adjustment of the servo-valve control 60 to the right of the neutral position shown in Figure 3, will cause the conduit 78 to serve as an inlet of pressure to the servo motor 79 and exert biasing force upon the piston 82 to the left. Thus it will be seen that in the conventional manner the direction of movement of the piston rod 84 may be controlled by the adjustment of the servo control valve 60.

While there has been shown in the present embodiment of the invention a hydraulic control and power means, it will be readily seen that other forms of controls and power means such as well known, mechanical and electronic controls and power means, may be readily substituted therefor.

It will be further noted that the outer end of the piston rod 84 under control of the power means aforesaid, is pivotally connected by a link 93 from that at which the end of the walking beam 12 from that at which the link 13 is connected, as previously described. It will thus be seen that the adjustment of the walking beam 12, and accordingly the throttle control shaft 16 is dependent upon the effect thereon of the adjustment of the main control shaft 6 and the servo-motor 79.

The pressure responsive mechanism 58, previously noted, comprises preferably a pair of bellows 97 and 98 mounted within the casing 7, as best shown in Figure 3. The bellows 98 is preferably partially evacuated and balanced by a coil spring 99 mounted within the bellows 98 so as to act against the biasing force of the bellows 97. A wall 102 formed within the casing 7 has mounted thereon the bellows 97 which is connected through a conduit 110 passing through the wall 102 to the intake manifold 20 of the internal combustion aircraft engine 21, as shown in Figure 1, in such a manner that the biasing force of the bellows 97 will vary in response to the intake manifold pressure. A plate 111 is mounted between the bellows 97 and 98 and is movable upon variance in the pressure exerted within the bellows 97, as is well known in the art. The plate 111 has provided a projecting arm 112 to which there is pivotally connected an end of the linkage arm 57, previously described.

From the foregoing it will be seen that the adjustment of the servo-valve control 60 will be dependent upon the intake manifold pressure acting upon the pressure responsive mechanism 58 and the corresponding adjustment thereof in relation to the adjustment of the cams 36 or 37. It should be pointed out here that the tension exerted by the spring 53 acting upon the push rod 52 has a considerably greater biasing force upon the servo control valve member 60 than the force exerted thereon by the relatively light tension exerted by the spring 62 mounted on the member 40, but the biasing forces exerted by the spring elements 53 and 62 have a substantially negligible effect upon the pressure responsive mechanism 58 due to the biasing force exerted by the much stronger spring 99 positioned within the bellows 98 for balancing the biasing force of the pressure within the bellows 97.

Thus it will be seen that in normal operation a decrease in the intake manifold pressure due to a rise in altitude for example, decrease in atmospheric pressure or other cause, would affect the bellows 97 and 98 so as to cause the relative contraction of the bellows 97 and the relative expansion of the bellows 98. Such action would cause the movement of the plate 111 and the longitudinal movement of the linkage arm 57 toward the left, as viewed in Figure 3.

Since, as previously explained, the spring 53 exerts a greater biasing force than the spring 62, it will be readily seen that such longitudinal movement of the arm 57 would cause the floating lever 55 to pivot in a counterclockwise direction on its pivotal connection to the push rod 52 resulting in a corresponding longitudinal movement of the link 59 and servo control valve member 60 to the left.

Thus with the control valve member 60 first in the neutral position, such adjustment of the servo control valve member 60 would cause the opening of the port 73 to the inlet of the pressure medium provided through the port 74, resulting in the shifting of the piston 82 to the right as viewed in Figure 3 and the mechanical adjustment of the throttle 19 to a relative increased open position through the action of the piston rod 84 on the link 93, walking beam 12, link 13, bell crank lever 15, throttle control shaft 16, arm 17, and rod 18, and thereby increasing the pressure exerted at the intake manifold.

Conversely, an increase in the intake manifold pressure would cause the relative expansion of the bellows 97 and contraction of the bellows 98, resulting in the longitudinal movement of the linkage arms 57 to the right.

Obviously, since the movement of the push rod 52 would be prevented by the spring 53, the latter adjustment of the linkage arm 57 would cause the clockwise movement of the floating lever 55 about its pivotal connection to the push rod 52, causing a corresponding longitudinal movement of the servo-control valve member 60 to the right. Thus with the control valve member first in the neutral position, such adjustment of the servo control valve member 60 would cause the opening of the port 75 to the inlet of the pressure medium provided through the port 74, causing a shifting of the piston 82 to the left and the mechanical adjustment of the throttle 19 to a relative decreased open position and thereby decreasing the pressure exerted at the intake manifold 20.

Thus it will be seen that there is provided automatic means for compensating for either an increase or decrease in the pressure at the intake manifold 20, so that a predetermined standard pressure condition may be approximated. Obviously, upon standard pressure conditions being approximated, the pressure responsive mechanism 58 will cause the adjustment of the servo control valve member 60 to a neutral position.

It will be further seen that there has been provided adjustment means whereby the value of the predetermined standard pressure condition may be varied. Thus upon movement of the control lever 1, as shown in Figure 3, in a counter-clockwise direction, a clockwise movement of the main control shaft 6 will result, causing a corresponding clockwise movement of the walking beam 12 about its pivotal connection to the link 93 and causing in turn the clockwise movement of the throttle control shaft 16 so as to move the throttle 19 to a relative open position.

Furthermore, it will be seen that such adjustment of the control arm 1 will cause also the clockwise movement of the arm 8 and a corresponding clockwise rotation of the cams 36 and 37, as viewed in Figure 3, for changing the datum or setting of the pressure responsive mechanism 58, as will be hereinafter explained.

There is further provided means to lock out the automatic adjustment means, whereby upon adjustment of the main control lever 1 to a predetermined minimum standard pressure selecting position, the opening of the throttle 19 may be affected only by the manual adjustment of the control lever 1 without regard to the pressure existing at the intake manifold or the condition of the pressure responsive mechanism. This is specifically accomplished by providing an adjustable abutment rod 114 best shown in Figure 3.

The abutment rod 114 is screw-threadedly engaged in the wall 102 and projects through the wall 102 into the bellows 97. A suitable cleft 115 is provided in the abutment rod 114 and is positioned exteriorly of the bellows 97 so that the abutment rod 114 may be conveniently adjusted longitudinally for calibration purposes. The abutment rod 114 is arranged so as to engage the plate 111 upon the pressure in the intake manifold decreasing to a predetermined low value equal to the critical standard value at which the automatic control for opening the throttle is to be discontinued and manual control alone remains.

Thus upon the manual control arm 1 being adjusted to the critical point for selection of the critical standard pressure value at and below which the automatic control for opening the throttle is to be discontinued, it will be apparent that if the actual pressure in the intake manifold be greater than the predetermined standard, the effect in the bellows 97 would be to cause the control valve member 60 to be adjusted so as to effect further closing of the throttle 19. However, if the intake manifold pressure be below the critical standard value, the bellows 97 would be prevented by the abutment rod 114 from contracting further so as to otherwise cause a further automatic opening of the throttle 19. Rather under the latter conditions, the opening of the throttle 19 may be accomplished only by positive manual adjustment of the control lever 1 toward the pressure increase position, while further closing of the throttle 19 may be accomplished by positive manual adjustment of the control lever 1 toward the pressure decrease position. Thus there is provided a safety means to permit the full closure of the throttle 19 regardless of the conditions acting upon the pressure responsive mechanism 58, which device, however, does not prevent the automatic closing of the throttle in the event of a pressure existing within the intake manifold greater than the value of the adjusted standard pressure value.

A second abutment rod 116 is also mounted within the bellows 98 as shown in Figure 3, for the purpose of limiting the excessive expansion of bellows 97 and contraction of bellows 98 which might otherwise cause mechanical damage thereto.

There is further provided a third safety means for preventing the automatic opening of the throttle 19 past a predetermined maximum critical point, and the said safety means so arranged that such opening of the throttle past such point, may only be accomplished under the positive manual control of the lever 1.

This function is specifically accomplished by providing the bell crank lever 14, previously described, with a knocker arm 117 arranged for actuating an arm 118. The arm 118, as shown in Figure 3, is pivotally mounted at one end on an eccentric pin 119 carried by an adjustment screw 120. The adjustment screw 120 is screw threadedly engaged in the wall of the casing 7. The position of the arm 118 in relation to the knocker arm 117 may be conveniently adjusted for calibration purposes by means of the screw 120 which extends through the wall of the casing 7 to the exterior, as shown and described in detail in the U. S. Patent No. 2,453,652 granted November 9, 1948, on the application Serial No. 783,237 filed October 31, 1947, by Howard A. Alexanderson as a continuation of the copending application of Howard A. Alexanderson, Serial No. 508,724 filed November 2, 1943, and now abandoned.

Carried by the arm 118 is a pin 123 on which is mounted a roller 124 arranged for engagement by the knocker arm 117, as shown in Figure 3. There further projects from the arm 118, a member 125 which is arranged to engage a valve actuating stop pin 126 slidably mounted within a sleeve member and projecting through the sleeve into the valve sleeve 61 where it is adapted to engage in its inward position, the free end of the servo control valve rod 60. The pin 126 is normally biased by a spring 128 into a disengaging relation from the rod 60. In the latter position the pin 126 under the biasing force of the spring 128 actuates the arm 118 in a counter-clockwise direction against a stop pin 129 mounted in the wall 7. Upon the throttle 19 being opened to a predetermined point the bell crank lever 15 will be positioned so as to cause the knocker arm 117 to engage the roller 124 mounted on the arm 118. Continued clockwise adjustment of the bell crank lever 15 will cause arm 118 to actuate the pin 126 inward so as to prevent control valve rod 60 from being adjusted through the floating lever 55 to a position to the left of the neutral position. In the latter locked position a decrease in pressure at the intake manifold 20 would cause merely a contraction of the bellows 97 and the actuation of the floating lever 55 so as to cause the movement of the push rod 52 toward the left against the biasing force of the spring 53.

An increase in pressure above the predetermined standard value set through the adjustment of the selector cams 36 or 37 would, of course, cause the adjustment of the valve control rod 60 to the right of the neutral position shown in Figure 3, effecting a corresponding decrease in the setting of the throttle 19 until the piston 82 had reached its limit of travel, as shown in Figure 3. From the position shown in Figure 3, an increase in pressure would not affect the valve 19 and further adjustment of the valve 19 in an opening direction could be effected only through operation of the control lever 1.

Thus it will be seen that there is provided means whereby the opening of the throttle 19 past a predetermined critical point can be accomplished only through the adjustment of the manual control 1. The latter features are described and claimed in the U. S. Patent No. 2,453,652 granted November 9, 1948, on the application Serial No. 783,237 filed October 31, 1947, by Howard A. Alexanderson as a continuation of the copending application of Howard A. Alexanderson, Serial No. 508,724 filed November 2, 1943, and now abandoned.

As previously explained, the adjustment of the shaft 35 causes the adjustment of the cams 36 and 37 and simultaneously therewith the adjustment of an arm 130 fixedly mounted thereon. A link 133 is pivotally connected at one end to the arm 130 and at the opposite end to an idler bell crank lever indicated generally by the numeral 135.

The bell crank lever 135 includes a pair of plates 136 and 137. Linkage members 138 and 139 are each pivotally connected at one of their ends to the plate 136 and at the opposite ends to the plate 137. The plate 136 is fixedly mounted on the shaft 140, while the plate 137 has provided a slot 141 in which the shaft 140 is adjustably mounted in relation to the plate 137.

Positioned on the shaft 140 is a sleeve 143 having a bushing 145 bearing upon the plate 137. The sleeve 143 is rotatably mounted in a bearing 146 provided in the casing 7. Screw threadedly engaged at the outer end of the shaft 140 is a nut 148 which bears upon the outer end of the sleeve 143 so that by tightening the nut 148 the bushing 145 may be forced towards the plate 137 so as to clamp the plate 137 between the bushing 145 and plate 136 in an adjusted position relative to the shaft 140.

The plate 137 has a lug 150 projecting from the same and to which the link 133 is pivotally connected. It will be readily seen that by adjusting the relative position of the plate 137 in relation to the shaft 140, the radius or distance from the point of connection of the link 133 and the shaft 140 may be adjusted and thereby the leverage ratio of the latter connection adjusted.

Projecting from the plate 136 is an arm 155 to which there is pivotally connected one end of a link 156. The opposite end of the link 156 is pivotally connected to an arm 157 fixedly mounted on a shaft 160. The shaft 160 is rotatably mounted in suitable bearings in the casing 7 and has mounted at the outer end an arm 165 which, as shown in Figure 1, is connected by a link 170 to an operating arm 171 for adjusting a propeller pitch governor control indicated generally by the numeral 175.

The latter propeller pitch governor control may be of a type well known in the art. The same is shown in Figure 1 as being of a type having an operating arm 171 mechanically connected to a gear 176 and rack 178 for adjusting a governor spring 180 and fly-weight governors 181. The fly-weights 181 are rotatably mounted at one end of a shaft 185 drivingly connected through suitable gear means, not shown, to a drive shaft of the aircraft engine 21. Slidably mounted in the shaft is a valve 186 of conventional type, adjustably positioned under tension of the spring 180 and the counter-acting biasing force of the centrifugally actuated fly-weights 181. The valve 186 is arranged to control the operation of a piston not shown, which controls the pitch of the propeller 190 driven by the aircraft engine 21.

Thus the engine speed or R. P. M. of the engine 21 may be adjusted by varying through the operating rod 170 the tension of the governor spring 180 and the resultant position of the pilot valve 186. Moreover through the foregoing linkage arrangement by adjusting the pilot's control lever 1, the engine intake manifold pressure together with the engine speed may be simultaneously adjusted.

The intake manifold pressure is controlled through operation of the cams 36 or 37 which are operably connected to control mechanism 58, as will now be explained.

Figure 4:
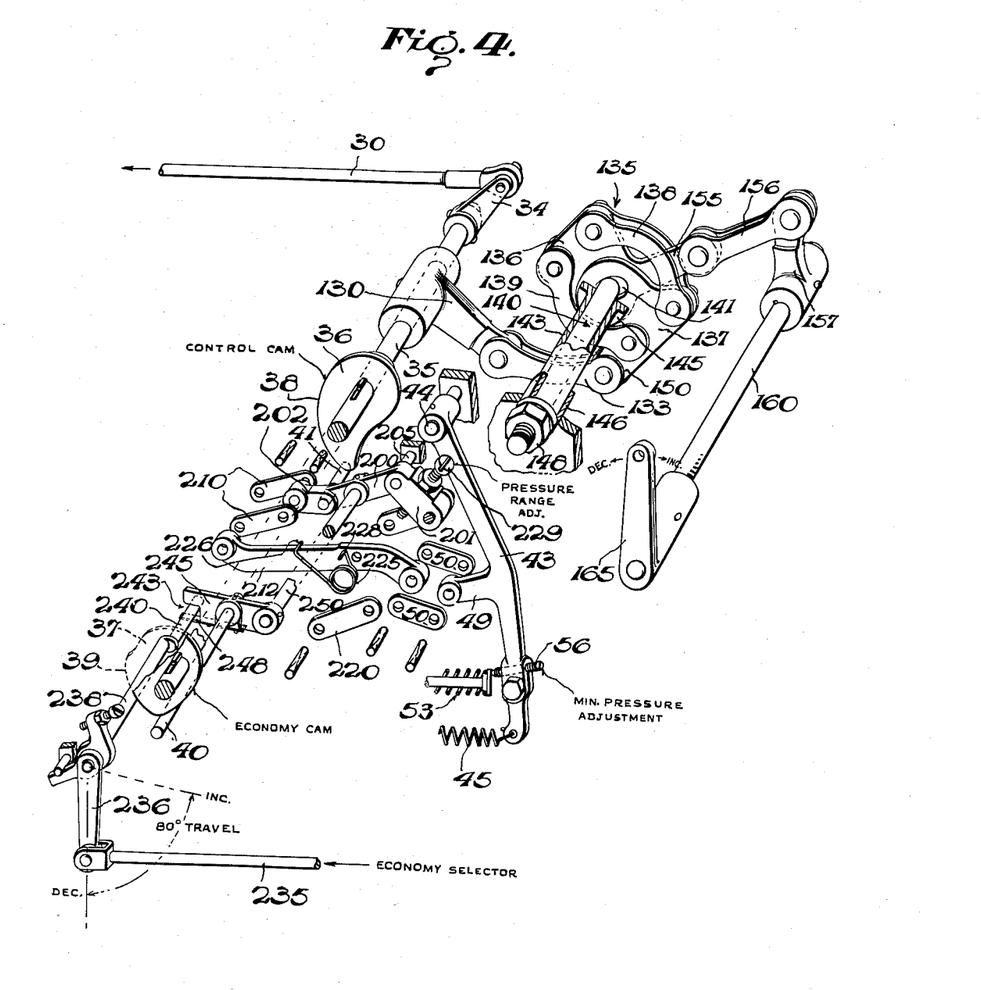
Figure 4 is an exploded view of the novel cam selector linkage arrangement of the present invention.

In normal operation, the pin 41 rides along the cam surface 38 of the cam 36. The latter pin is mounted in a rigid member 200, as shown in Figures 3 and 4. The rigid member 200 is formed with a portion 201 projecting at an angle in one direction from one end of the main body portion 200, while at the opposite end a second body portion 202 projects at an angle in another direction.

The rigid member 200 is pivotally mounted on a pin 205 in the casing 7. The portion 202 is pivotally connected by a link 210 to one end of a second rigid member 212. An opposite end portion 215 of the rigid member 212 projects at an angle to the main body of the member 212 and is connected by the link 50 to the spring biased lever arm 43.

The portion 201 of the rigid member 200 is pivotally connected by a link 220 to the member 212 at a point intermediate the opposite ends of the member 212. A torsion spring 225 is mounted on the member 212. The spring 225 has an end portion 226 engaging the member 212 and an opposite end portion 228 engaging the link 220 so as to bias the link 220 about its pivotal connection to the member 212 in a clockwise direction. The spring 225 thereby biases member 212 into contacting relation with an end of an adjustable screw 229 which is screw threadedly engaged in the portion 201 of member 200.

The arm 212 is normally biased under force of the spring 45 and arm 43 in a clockwise direction about the pin 205, together with the portions 202 and 201 of the member 200 so that the pin 41 comes into contacting relation with the surface 38 of the control cam 36 which thereby limits the position of the arm 43 and accordingly through push rod 52 the position of floating lever 55. The adjustable screw 229 provides a convenient pressure range adjustment means.

The cam surface 38 is so arranged in relation to the pin 41 that as the cam is rotated in a clockwise direction, the pin 41 following the cam surface 38 under tension of the spring 45 causes the members 200 and 212 to pivot about the pin 205 in a counter-clockwise direction causing in turn through link 50, the pivotal movement of the arm 43 in a counter-clockwise direction about the pin 44.

Further with the bellows 97 and 98, in a balanced relation and the servo control valve member 60 in a neutral position, it will be seen that since the spring 53 exerts a greater biasing force than the spring 62 that the latter counter-clockwise movement of the arm 43 will cause through the push rod 52 the pivoting of the floating lever 55 in a similar counter-clockwise direction about its pivotal connection on the arm 57 and cause in turn a longitudinal movement of the link 59 servo control valve member 60 to the left as viewed in Figure 3.

Such movement of the servo control valve member 60, as previously described, will then cause an adjustment of the throttle 19 to a relative increased open position until the increased pressure resulting in the intake manifold 20 causes the bellows 97 to expand effecting a longitudinal movement of the arm 57 to the right and the readjustment of the servo control valve member 60 to a neutral position. It will be thus seen that such adjustment of the control arm 1 will cause an increase in the value of the predetermined standard intake manifold pressure.

Conversely an adjustment of the manual control lever 1 in an opposite or clockwise direction would cause a decrease in the value of the predetermined standard intake manifold pressure.

Such clockwise movement of the control lever 1 will effect a corresponding counterclockwise movement of the arms 5 and 8 and arm 34 connected to arm 8 by the link 30. This will in turn effect movement of the throttle valve 19 in a closing direction through the operative linkage 11, 12, 13, 14, shaft 16 and linkage 17 and 18 and the adjustment of the cam 36 in a counterclockwise direction. Member 200 under the force exerted by the spring 45 through arm 43, link 50 and member 212 will then pivot about pin 205 in a clockwise direction causing pin 41 to follow the cam surface 38 of the cam 36. It will be seen then that as the effective surface 38 of the cam 36 decreases with the counterclockwise movement of cam 36, the arm 43 will move in a clockwise direction under force of spring 45 causing the push rod 52 to be adjusted towards the left moving the floating lever 55 in a clockwise direction about its pivotal connection to the linkage arm 57 and moving the link 59 and valve 60 to the right of its neutral position. The latter action causes the servo motor 79 through its operative linkage connection 84, 93, 12, 13, 14, 16, 17 and 18 to adjust the valve 19 in a further closing direction so as to decrease the intake manifold pressure. Upon decrease in the intake manifold pressure, the bellows 97 operatively connected thereto through conduit 110, Figures 1 and 3, will then tend to collapse moving arm 57 in a direction for resetting the valve 60 to its neutral position at a decreased pressure setting.

Thus as the manual control lever 1 is adjusted in a decrease manifold pressure direction, the value of the predetermined standard intake pressure is decreased, while as the control 1 is adjusted in the opposite direction, this predetermined standard value is increased.

Figure 2:
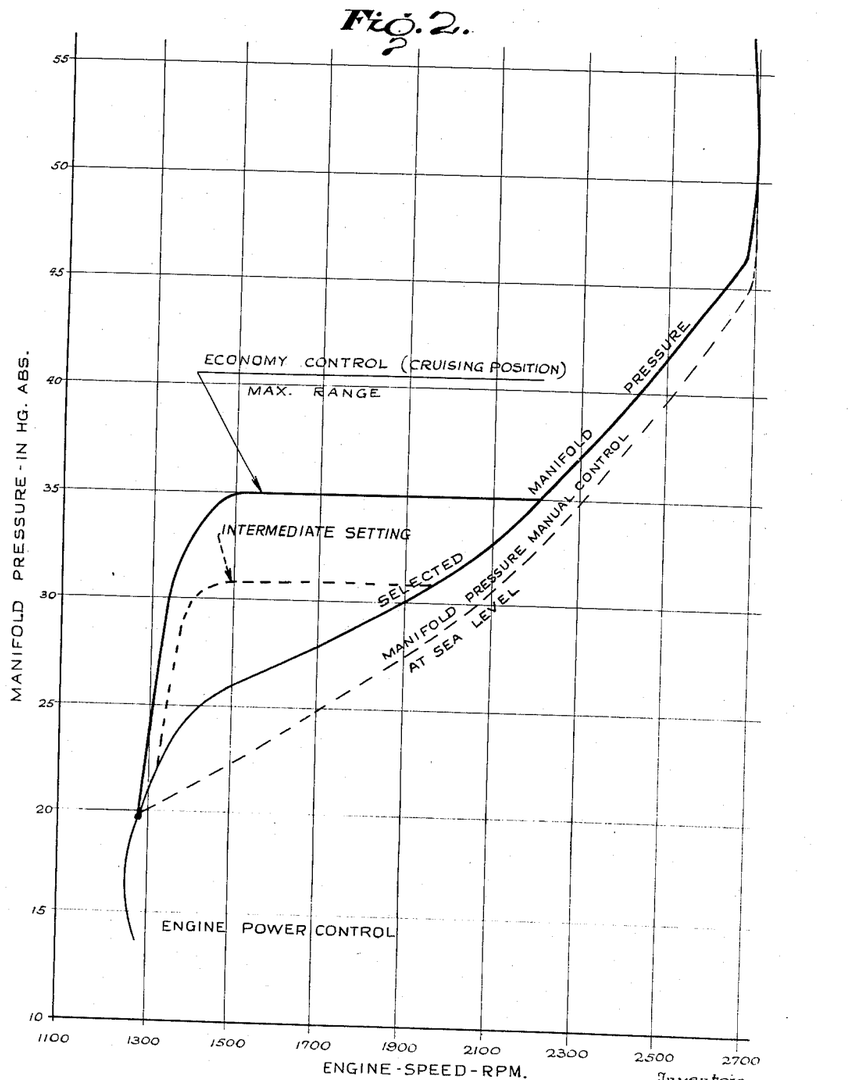
Figure 2 is a view illustrating graphically the operative characteristics of the control mechanism.

Moreover, since the propeller pitch governor control 175 is adjusted simultaneously with the intake manifold pressure, it will be seen that, as shown graphically in Figure 2, a definite relationship is maintained between the manifold selected pressure and the engine speed.

Thus as the control lever 1 is moved in a counterclockwise or pressure increasing direction, the arm 165 is moved in a clockwise direction as it is operably connected as shown in Figure 3, through the shaft 160, arm 157, link 156, arm 155, linkage 135 pivotally mounted in bearing 146, arm 150, link 133, arm 130, arm 34, link 30, arm 8, arm 5, and link 3 to the control lever 1. The aforesaid clockwise movement of arm 165, as shown in Figure 1, causes link 170 to impart to arm 171 and gear 176 a corresponding clockwise movement which adjusts the rack 178 downward so as to increase the tension exerted by spring 180 on the fly-weight governor 181. The latter action as is well known will cause an increase in the speed setting of the propeller pitch governor 175 so as to cause the valve 186 controlling a suitable servo motor of a type well known in the art to decrease the pitch of the propeller 190, whereupon the speed of the engine is increased and the fly weight governor 181 driven by the engine thereupon resets the valve 186 to its neutral position.

Thus as shown graphically by Figure 2 as the manifold pressure setting of the regulator 7 is increased a corresponding incerase in the engine speed is effected by the adjustment of the governor 175.

Likewise, as the control lever 1 is moved in a clockwise or pressure decreasing direction, the arm 165 through the operative connections described, is moved in a counterclockwise direction so as to decrease the speed setting of the governor so as to correspond with the decrease in the intake manifold pressure setting, as indicated graphically in Figure 2.

There is further provided in the present invention novel means whereby a second selected program may be substituted for the first program and indicated graphically in Figure 2 as economy control.

In order to accomplish the foregoing, there is provided on the shaft 35 the cam 37 having the cam surface 39 for contacting the pin 40. In normal operation the pin 40 is held in an inoperative position as shown in Figure 3.

As an operating means for the pin 40 there is provided a control lever 230, which may be conveniently mounted within the cabin of the aircraft for operation by the pilot. As shown in Figure 3, the control lever 230 is shown in an inoperative position.

The control lever 230 is pivotally mounted at a point 232 intermediate the opposite ends of the control lever 230. The control lever 230 is connected at one end to a control rod 235. The opposite end of the control rod 235 is pivotally connected to an arm 236 mounted on a control shaft 238 and positioned exteriorly of the casing 7.

The control shaft 238 extends into the casing 7 and is rotatably mounted in a suitable bearing. Formed at the inner end of the shaft 238 is an eccentric pin 240 positioned in a notch 243 formed in one end of a lever 245. A leaf spring 248 is provided so as to assure the retention of the pin 240 loosely in the notch 243.

The lever 245 is pivotally connected at the opposite end by a pin 250 to a point intermediate the opposite ends of the member 200.

The pin 40 has one end fixedly mounted in the lever 245 at a point intermediate the opposite ends thereof.

From the foregoing it will be readily seen that by adjusting the economy control lever 230 in a counter-clockwise direction, a counter-clockwise rotation will be imparted to the arm 236 causing the pin 240 to move in a counter-clockwise direction and pivoting the lever 245 about the pin 250 in a clockwise direction until the pin 40 contacts the surface 39 of the cam 37. In certain adjusted positions of the main control lever 1, as indicated graphically in Figure 2, continued rotation of the pin 240 in a counter-clockwise direction will cause upon pin 40 contacting the surface 39 of the cam 37 the adjustment of the lever 245 in a clockwise direction about the pin 40 contacting the surface 39 of the cam 37.

Such movement of the lever 245 will cause the member 200 to be pivoted about the pin 205 in a counterclockwise direction, lifting the pin 41 from the surface 38 of the cam 36 and imparting a further counter-clockwise rotation to the lever 43 and increasing thereby through the push rod 52, the normal pressure setting for the control mechanism 58. By adjusting the economy control lever 230 to the extreme adjusted position, the maximum range indicated in Figure 2 may be effected. A lesser degree of adjustment will give an intermediate setting such as indicated, for example, in Figure 2 by the dotted lines.

As shown in Figure 2, the adjustment of the economy control selector 230 is effective only within a limited range. Adjustment of the main control lever 1 to a degree in excess of this limited range will prevent the economy control 230 from taking effect and the cam 36 dominates in the latter excessive range.

The latter action is effected by the relationship of the effective surfaces of cams 36 and 37. Thus, when the main control lever 1 has been set for an intake manifold pressure and engine speed in excess of a limited range, for example a manifold pressure in excess of thirty-five inches of mercury and an engine speed in excess of approximately 2200 R. P. M., as shown in Figure 2, the effective cam surface 38 of the cam 36 is such as to prevent the pin 40 from contacting cam 37. Thus upon such adjustment of cam 36 the pin 41 and the member 200 operatively connected thereto are adjusted about the pivot pin 205 to such an extent that the pin 40 operatively connected thereto through the pivot pin 250 and arm 245 is adjusted out of contacting relation with the cam 37 sufficiently to prevent the pin 40 from being moved, by adjustment of lever 230 and pin 240, into contacting relation with the cam surface 39 of cam 37.

Moreover within the economy control range, the selected pressure settings below and above which the economy control may predominate may be varied by appropriate adjustment of the lever 230, which by adjustment of the pin 243 and accordingly the arm 245 and pin 40 determines the pressure setting or point of adjustment of the cam 36 at which the cam 37 may take over control and the extent of pressure resetting effected by cam 37, as shown in Figure 2 for example, by the dotted line indicated "Intermediate setting."

In the operation of the aforedescribed device, it will be seen that in starting with the control lever 1 at the extreme clockwise position or pressure decrease position, the servo piston 82 is adjusted to the extreme left or pressure decrease position and the propeller pitch control governor is set for a minimum engine speed of for example 1250 R. P. M. At sea level, as the throttle is opened (with the engine running) by movement of lever 1 in a counterclockwise direction the throttle 19 may be controlled manually up to a limited intake manifold pressure and engine speed of for example approximately 20″ Hg abs. manifold pressure and 1300 R. P. M. This is specifically accomplished by the automatic lock out abutment rod 114 shown in Figure 3, the operation of which has been previously explained. Above this limited range of approximately 20″ Hg abs. manifold pressure setting, the throttle 19 is controlled automatically by the servo piston 82. During automatic control, if the manifold pressure at the minimum throttle angle is lower than the selected manifold pressure, the throttle 19 may be opened by the servo piston to give the selected pressure. Motion of the pilot's control lever 1 towards increased power increases both manifold pressure and R. P. M. settings simultaneously, as shown graphically in Figure 2 by the adjustment of arms 17 and 165, respectively, through the automatic control mechanism and operative linkage previously explained and shown in Figure 3.

Upon further movement of the lever 1 so as to approach the full open throttle position, the knocker arm 117 actuates the stop pin 126 to affect the automatic control, as previously explained, so that adjustment of the throttle 19 to a full open position may be effected only by manual adjustment of the lever 1 to the maximum pressure position.

The economy control lever 230 provides separate selector means, whereby the pilot may vary the relationship between the regulated intake manifold pressure and the governed engine R. P. M. within a predetermined range, shown for example in Figure 2 as between approximately 1300 and 2200 R. P. M. In operating the economy control lever 230 the main control lever 1 may be first moved to give the desired engine R. P. M. setting and then the economy control 230 may be moved to effect the desired intake manifold pressure setting.

Selection above the limited range of 2200 causes the manifold pressure to return to the normal program of operation.

From the foregoing it will be seen that there is provided novel means for effecting coordinated control of engine speed and manifold pressure through a predetermined program by use of a single control lever 1. Moreover, there is provided further novel means, the operative mechanism previously explained and controlled by the lever 230, to vary the normal program for setting the manifold pressure in relation to engine R. P. M., in the cruising range of powers.

Although only one embodiment of the invention has been illustrated and described, various changes in the form and relative arrangements of the parts, which will now appear to those skilled in the art, may be made without departing from the scope of the invention. Reference is, therefore, to be had to the appended claims for a definition of the limits of the invention.

What is claimed is:

1. A device of the character described, comprising, in combination, condition responsive means for automatically adjusting a control device, a first control member for adjusting the datum of said automatic means in accordance with a first predetermined program, a second control member for adjusting the datum of said automatic means in accordance with a different second predetermined program, first manually operable means for simultaneously adjusting said first and second control members, and second manually operable means for placing the first control member in an inoperative relation to said automatic means and said second control member in an operative relation to said automatic means within a predetermined operating range of said first manually operable means.

2. For use with an aircraft engine having a speed control governor, a speed setting means, a throttle valve, and a pilot's control lever; a boost control, comprising, in combination, engine intake manifold pressure responsive means arranged to vary the position of said throttle valve so as to maintain the intake manifold pressure of said engine at a selected value, first means for changing the datum of said pressure responsive means in accordance with a first predetermined program, second means for changing the datum of said pressure responsive means in accordance with a different second predetermined program, means to connect said first and second datum changing means and said speed setting means to said control lever for operation simultaneously by said pilot's control lever, and a pilot's selector lever for actuating said first and second means alternately into operating relation to change the relationship between engine speed and the engine intake manifold pressure.

3. The combination comprising a pair of cams, first and second cam follower elements, a pivotally mounted control member carrying the first element, spring means biasing said control member in a direction forcing said first element into contacting relation with said first cam to effect adjustment of said first element through operation of said first cam in accordance with a first predetermined program, an adjustable arm pivotally connected to said control member, said arm carrying said second element and arranged so that by pivotal movement of said arm in one sense relative to said member said second element may be moved into contacting relation with said second cam and upon further movement of said arm in said one sense said arm may be pivoted upon said second element in such a manner as to actuate said member so as to force said first element out of contacting relation with said first cam, whereupon adjustment of said control member may be controlled by said second cam in accordance with a different second predetermined program.

4. The combination comprising a first manually operable shaft, a first and a second cam mounted on said shaft, first and second cam follower elements, a pivotally mounted control member carrying the first element, spring means biasing said control member in a direction forcing said first element into contacting relation with said first cam to effect adjustment of said first element through operation of said first cam in accordance with a first predetermined program, an arm pivotally connected at one end to said control member, said arm having a notch formed at the opposite end, a second manually operable shaft, an eccentric pin positioned at one end of the second shaft and in said notch for adjusting said arm, and said arm carrying said second cam follower element so that upon adjustment of said arm by said second manually operable shaft said arm may be pivoted in relation to said member so as to move said second element into contacting relation with said second cam, and then upon further adjustment by said shaft the arm may be pivoted on said second element so as to move said first element out of contacting relation with said first cam so that adjustment of said control member may be effected through operation of said second cam in accordance with a different second predetermined program and independently of said first cam.

5. For use with a supercharged aircraft engine having an induction throttle valve, a speed control governor, a speed setting means, an induction throttle valve, and a pilot's control lever; the combination comprising means to connect said lever to said speed setting means, other means to connect said lever to said throttle valve, a boost control connected to said other connecting means arranged to vary the position of said throttle valve relatively to that of said control lever according to the intake manifold pressure of said engine, means for changing the datum of said boost control, including first and second cams operably connected to said pilot's control lever, first and second cam follower elements, a pivotally mounted control member carrying the first element and operably connected to the boost control for controlling the datum thereof through operation of said first cam in accordance with a first predetermined datum changing program, spring means biasing said control member in a direction forcing said first element into contacting relation with the first cam, a manually adjustable arm pivotally connected to said control member, said arm carrying said second element and arranged so that by pivotal movement of said arm in one sense relative to said member said second element may be moved into contacting relation with the other of said cams and upon further movement of said arm in said one sense said arm may be pivoted upon said second element in such a manner as to force said first element out of contacting relation with said first cam, whereupon the datum of said boost control may be controlled by said control member through the operation of said second cam in accordance with a different second predetermined program.

6. For use with a supercharged aircraft engine having an induction throttle valve, a speed control governor, a speed setting means, an induction throttle valve, and a pilot's control lever; the combination comprising means to connect said lever to said speed setting means, other means to connect said lever to said throttle valve, a boost control connected to said other connecting means arranged to vary the position of said throttle valve relatively to that of said control lever according to the intake manifold pressure of said engine, means for changing the datum of said boost control, including first and second cams operably connected to said pilot's control lever, first and second cam follower elements, a pivotally mounted control member carrying the first element and operably connected to the boost control for controlling the datum thereof through operation of said first cam in accordance with a first predetermined datum changing program, spring means biasing said control member in a direction forcing said first element into contacting relation with the first cam, a pilot's selector lever, an adjustable arm operably connected to said pilot's selector lever, said arm carrying said second element and arranged so that by pivotal movement of said arm in one sense relative to said member said second element may be moved into contacting relation with the other of said cams and upon further movement of said arm in said one sense said arm may be pivoted upon said second element in such a manner as to force said first element out of contacting relation with said first cam, whereupon the datum of said boost control may be controlled by said control member through the operation of said second cam in accordance with a different second predetermined program.

7. For use with an internal combustion engine having a variable pitch propeller driven thereby, a governor controlling the pitch of the propeller so as to govern the engine speed, and a regulating device responsive to the induction pressure of the engine to maintain said pressure at a predetermined value; means for changing the datum of said regulator and governor, comprising, in combination, a pilot operated control lever, first and second cams, first means connecting said first and second cams to said control lever, second means connecting the governor to said first connecting means for the adjustment of the datum thereof by said control lever, first and second cam follower elements for said cams, a pivotally mounted member carrying the first element and operably connected to said regulator for changing the datum thereof, spring means biasing said member in a direction forcing said first element into contacting relation with the first cam for controlling the datum of said regulator, a pilot operated selector level, an arm operably connected to said selector lever, said arm carrying the second element and arranged so that by adjustment of said selector lever in one sense movement may be imparted to said arm causing said second element to be moved into contacting relation with the other of said cams and upon further movement of said selector lever said arm may be pivoted upon said second element so as to force said first element out of contacting relation with said first cam so that said second cam may control the datum of said regulator independently of said first cam, whereby the relationship between engine speed and induction pressure may be changed by the pilot from a first to a second predetermined operating program.

8. For use with an internal combustion engine having a variable pitch propeller driven thereby, a governor controlling the pitch of the propeller so as to govern the engine speed, and a regulating device responsive to the induction pressure of the engine to maintain said pressure at a predetermined value; means for changing the datum of said regulator and governor, comprising, in combination a pilot operated control lever, first and second cams, first means connecting said first and second cams to said control lever, second means connecting the governor to said first connecting means for the adjustment of the datum thereof by said control lever, first and second cam follower elements for said cams, a pivotally mounted member carrying the first element and operably connected to said regulator for changing the datum thereof, spring means biasing said member in a direction forcing said first element into contacting relation with the first cam for controlling the datum of said regulator, a pilot operated selector lever, an arm operably connected to said selector lever, said arm carrying the second element and arranged so that by adjustment of said selector lever in one sense movement may be imparted to said arm causing said second element to be moved into contacting relation with the other of said cams and upon further movement of said selector lever said arm may be pivoted upon said second element so as to force said first element out of contacting relation with said first cam so that said second cam may control the datum of said regulator independently of said first cam, whereby the relationship between engine speed and induction pressure may be changed by the pilot from a first to a second predetermined operating program, and said first cam so arranged in relationship to said second cam as to permit said second cam to take control of the datum of said regulator only within a predetermined engine speed control range.

9. For use with an internal combustion engine having a variable pitch propeller driven thereby, a governor controlling the pitch of the propeller so as to govern the engine speed, a pilot's control lever, and an induction throttle valve for said engine, the combination comprising a boost control including means to vary the position of said throttle valve in response to intake manifold pressure of said engine so as to maintain the pressure at a selected value, first means for changing the datum of said governor, second means for changing the datum of said boost control, means for operating said first and second means simultaneously by said pilot's control lever in accordance with a first predetermined program, third means for changing the datum of said boost control, a pilot's selector lever for alternately placing said second and third means into operation, and means for operating said first and third datum changing means simultaneously by said pilot's control lever in accordance with a second predetermined program.

10. Apparatus for controlling the power output of a supercharged internal combustion engine, comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movements of the second member from normal position for modifying the schedule of engine power output factors while the first manually operable member remains in set position and means actuated by the movement of the first manually operable member to a certain low pressure position for effecting said predetermined schedule of engine power output while the second manually operable member remains in a position away from normal.

11. Apparatus for controlling the power output of a supercharged internal combustion engine, comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movements of the second member from normal position for modifying the schedule of engine power output factors while the first manually operable member remains in set position and means actuated by movements of the first manually operable member to a certain high pressure position for effecting said predetermined schedule of engine power output while the second manually operable member remains in a position away from normal.

12. Apparatus for controlling the power output of a supercharged internal combustion engine, comprising a manually operated member, means adjusted thereby for controlling engine fuel intake pressure, means operated by the manually operated member for adjusting the governed speed of the engine in predetermined relation to the intake pressure whereby a predetermined schedule of relations between the pressure and speed factors of engine power output is maintained with respect to movements of the manually operated member, a second manually operable member, means actuated by movements of the second member from normal position for modifying the schedule of engine power output factors while the first manually operable member remains in set position, within a range of low pressure settings and a certain limited range of high pressure settings, means actuated by movements of the first manually operable member to a certain low pressure setting for effecting said predetermined schedule of engine power output while the second manually operable member remains in a position away from normal and means actuated by movement of the first manually operable member to a certain high pressure setting for effecting said predetermined schedule of engine power output while the second manually operable member remains in a position away from normal.

13. Apparatus for controlling the power output of a supercharged internal combustion engine, comprising a throttle valve for controlling the engine fuel intake, a manually operable member for operating the throttle valve, means responsive to fuel intake pressure for so operating the throttle valve as to maintain a selected pressure, means operated by the manually operated member for selecting the pressure to be maintained, means operated by the manually operated member for determining the governed engine speed in predetermined relation to pressure selection whereby movement of the manually operable member controls the pressure and speed factors of engine power output according to a predetermined schedule, a second manually operable member, means actuated by movement of the second manually operable member from a normal position, when the position of the first manually operable member is in a setting above a certain low pressure setting, for modifying the value of one of the engine power factors while the setting of the first manually operable member remains fixed and means operable by the first manually operable member to a certain low pressure position for effecting said predetermined schedule of engine power output while the second manually operable member remains away from normal position.

14. Apparatus for controlling the power output of a supercharged internal combustion engine, comprising a throttle valve for controlling the engine fuel intake, a manually operable member for operating the throttle valve, means responsive to fuel intake pressure for so operating the throttle valve as to maintain a selected pressure, means operated by the manually operated member for selecting the pressure to be maintained, means operated by the manually operated member for determining the governed engine speed in predetermined relation to pressure selection whereby movement of the manually operable member controls the pressure and speed factors of engine power output according to a predetermined schedule, a second manually operable member, means actuated by movements of the second manually operable member from a normal position when the position of the first manually operable member is in a setting below a certain high pressure setting, for modifying the value of one of the engine power factors while the setting of the first manually operable member remains fixed and means operable by the first manually operable member to a certain high pressure position for effecting said predetermined schedule of engine power output while the second manually operable member remains away from normal position.

15. Apparatus for controlling the power output of a supercharged internal combustion engine, comprising a throttle valve for controlling the engine fuel intake, a manually operable member for operating the throttle valve, means responsive to fuel intake pressure for so operating the throttle valve as to maintain a selected pressure, means operated by the manually operated member for determining the governed engine speed in predetermined relation to pressure selection whereby movement of the manually operable member controls the pressure and speed factors of engine power output according to a predetermined schedule, a second manually operable member, means actuated by movements of the second manually operable member from a normal position, when the position of the first manually operable member is in a setting above a certain low setting and below a certain high pressure setting, for the value of one of the engine power factors while the setting of the first manually operable member remains fixed, and means operable by the first manually operable member to a certain low pressure position for effecting said predetermined schedule of engine power output while the second manually operable member remains away from normal position and means operable by the first manually operable member to a certain high pressure position for effecting said predetermined schedule of engine power output while the second manually operable member remains away from normal position.

16. Apparatus for controlling the power output of an internal combustion engine, comprising a control member, means controlled thereby for variably regulating the manifold pressure and means for variably regulating the engine speed to maintain a definite schedule of power output, means for modifying said definite power output schedule by modifying the action of one of the means which are controlled by said control member, independently of said control member and means for effecting said definite power output schedule whenever the control member is moved to one of its limits of movement and irrespective of said modifying means.

17. A device of the character described, said device comprising condition responsive means for automatically adjusting a control device, a first control member, datum changing means, said datum changing means being operable by said first control member for changing the datum of said condition responsive means in accordance with a first predetermined program, a second control member, said datum changing means being alternately operable by said second control member for changing the datum of said condition responsive means in accordance with a different second predetermined program, and manually operable means for selectively placing the first of said control members out of operative relation with the datum changing means of said condition responsive means and the second of said control members in operative relation with the datum changing means of said condition responsive means.

18. A device of the character described, said device comprising condition responsive means for automatically adjusting a control device, a first control member, datum changing means, said datum changing means being operable by said first control member for changing the datum of said condition responsive means in accordance with a first predetermined program, a second control member, said datum changing means being alternately operable by said second control member for changing the datum of said condition responsive means in accordance with a different second predetermined program, first manually operable means for simultaneously actuating said first and second control members, and second manually operable means for selectively connecting one of said control members in operative relation with the datum changing means of said condition responsive means while disconnecting the other of said control members from operative relation with the datum changing means of said condition responsive means.

19. A device for automatically controlling the manifold pressure of an internal combustion engine, said device comprising a pressure regulating device responsive to said manifold pressure for automatically maintaining the same at a selected value, a pressure selecting mechanism to adjust the setting of said pressure regulating device, a first manually operable element operatively connected to said pressure selecting mechanism, said pressure selecting mechanism including two movement transmission members positioned simultaneously and jointly by said first manually operable element, linkage means for cooperating with said members to transmit movement from said members to adjust the pressure setting of the regulating device, and a second manually operable element operatively connected to said linkage means for selectively rendering one of said movement transmission members inoperative and the other of said members operative relative to said linkage means.

20. The combination defined by claim 19 including pins carried by the linkage means and alternately cooperable with the movement transmission members, and means operable by the other manually operable means to actuate one of said pins into operative engagement with one of the movement transmission members and the other of said pins out of operative engagement with the other of said movement transmission members so as to vary the selected pressure values of the pressure regulating device in accordance with different predetermined programs.

21. The combination defined by claim 19 including an engine speed control governor having a speed setting device therefor, means operatively connecting the speed setting device with the first manually operable element so that the speed setting device is adjusted simultaneously with the pressure selecting mechanism so as to maintain a predetermined relationship between engine speed and manifold pressure, said relationship being modified upon actuation of the second manually operable element within a predetermined portion of the range of adjustment of the engine speed setting device.

22. The combination defined by claim 21 in which the one movement transmission member is so arranged in relationship to the other movement transmission member that the latter takes control of the setting of the pressure regulating device only within a predetermined portion of the range of adjustment of the engine speed setting device.

23. A controller for an engine having speed governing apparatus comprising means for maintaining a selected engine intake pressure condition, means for selecting the intake pressure condition to be maintained, means for controlling the governing apparatus to maintain a selected speed condition, means for selecting the speed condition to be maintained, one of said condition selecting means including means for selecting such condition according to one of a plurality of schedules in relation to the other condition selection, said last-mentioned means including first means for selecting such one condition in accordance with a first predetermined program and second means for selecting such one condition in accordance with a different second predetermined program, means for adjusting the first and second means alternately into operating relation to determine the schedule of condition selection which shall be effective, and means for operating the pressure condition selector and the speed condition selector concurrently.

24. A controller for an engine having speed governing apparatus comprising, in combination, means for maintaining some selected pressure condition in the engine intake, means for selecting the pressure condition to be maintained in said intake, means for controlling the speed governing apparatus to maintain a selected speed condition, means for selecting the engine speed condition to be maintained, one of said condition selecting means including a plurality of cams for selecting such condition according to any one of a plurality of schedules having different relations to the other condition selection, said one condition selecting means including means for determining the particular cam and thereby the condition selecting schedule which shall be effective, and means for connecting the speed condition selecting means with the pressure condition selecting means so that said speed condition selecting means and pressure condition selecting means are operated simultaneously.

References Cited in the file of this patent

UNITED STATES PATENTS

| | | |
|---|---|---|
| 2,115,485 | Dodson | Apr. 26, 1938 |
| 2,154,887 | Baker | Apr. 18, 1939 |
| 2,217,364 | Halford et al. | Oct. 8, 1940 |
| 2,336,844 | Buck | Dec. 14, 1943 |
| 2,346,916 | Halford et al. | Apr. 18, 1944 |
| 2,383,719 | Halford et al. | Aug. 28, 1945 |
| 2,396,618 | Stieglitz | Mar. 12, 1946 |
| 2,428,531 | Schorn | Oct. 7, 1947 |